US006180233B1

(12) United States Patent
Shaw

(10) Patent No.: US 6,180,233 B1
(45) Date of Patent: Jan. 30, 2001

(54) SORBENT GLASS FIBER MATERIAL

(75) Inventor: Wayne E. Shaw, Glen Mills, PA (US)

(73) Assignee: CertainTeed Corporation, Valley Forge, PA (US)

( * ) Notice: Under 35 U.S.C. 154(b), the term of this patent shall be extended for 0 days.

(21) Appl. No.: 09/368,809

(22) Filed: Aug. 5, 1999

(51) Int. Cl.[7] ..................................................... B32B 9/00
(52) U.S. Cl. ........................ 428/392; 428/372; 428/375; 428/378
(58) Field of Search .................................. 428/372, 392, 428/375, 378

(56) References Cited

U.S. PATENT DOCUMENTS

| 4,429,001 | 1/1984 | Kolpin et al. | 128/284 |
|---|---|---|---|
| 4,914,170 | 4/1990 | Chang et al. | 526/240 |
| 5,078,890 | 1/1992 | Conche et al. | 210/691 |
| 5,215,407 | 6/1993 | Brelsford | 405/63 |
| 5,314,325 | 5/1994 | Bosler | 425/384 |
| 5,516,580 * | 5/1996 | Frenette et al. | 428/288 |
| 5,571,618 | 11/1996 | Hansen et al. | 428/359 |
| 5,921,055 * | 7/1999 | Romes et al. | 52/742.13 |
| 6,012,263 * | 1/2000 | Church et al. | 52/742.13 |
| 6,013,325 * | 1/2000 | Houben et al. | 427/389.9 |

* cited by examiner

Primary Examiner—Newton Edwards
Assistant Examiner—J. M. Gray
(74) Attorney, Agent, or Firm—Duane Morris & Heckscher LLP

(57) ABSTRACT

A sorbent glass fiber material is useful for sorbing spills of water and water-soluble liquids. The sorbent material includes glass fibers combined with hydrophilic absorbent particles. The particles may be made from polymers having hydrophilic groups such as crosslinked polyacrylamide, crosslinked sulfonated polystyrene, crosslinked polyacrylate, crosslinked polymethacrylates, crosslinked copolymers of acrylates and methacrylates, and mixtures thereof. The glass fibers may be bindered (e.g., batting insulation) or unbindered (e.g., loose-fill blown wool insulation).

9 Claims, 3 Drawing Sheets

SORBENT GLASS FIBER MATERIAL

FIELD OF THE INVENTION

The present invention relates in general to sorbent materials and in particular to sorbent glass fiber materials.

BACKGROUND OF THE INVENTION

Sorbent materials are useful in medical, personal hygiene and pollutant recovery applications, among others. Fibrous materials such as wools and felts, including glass fiber materials, have been used for such applications. FIG. 1 illustrates a mass of conventional glass fiber insulation material 10 in contact with a quantity of water 12 disposed on a solid substrate 14.

U.S. Pat. Nos. 5,215,407 and 5,078,890, for example, respectively disclose the use of loose-fill (i.e., unbindered) and glass fiber felt (i.e., bindered) glass fibers as means for cleaning up spills of oils and other liquid pollutants. U.S. Pat. No. 5,215,407 discloses the use of bundles of shredded blown glass fibers for absorbing materials such as oil from water and other surfaces. For such spills, glass fibers that preferentially absorb oil rather than water are preferred. U.S. Pat No. 5,078,890 discloses the use of felts made of mineral fibers for absorbing petroleum products from bodies of water. The felts include glass wool or rock wool, and comprise highly compressed fibers. Prior to compression, the fibers are cut into particles of less than 4 cm. The fibers are compressed with a binding agent, which is preferably of a water-repellent material, thus enhancing the hydrophobicity of the felts. Such hydrophobic materials may not be adequate for absorbing water and aqueous liquids.

A continued need exists, therefore, for materials capable of sorbing liquids, including water-soluble and water-based liquids.

SUMMARY OF THE INVENTION

One aspect of the invention is a sorbent material comprising a glass fiber material and at least one hydrophilic particulate material.

Another aspect of the invention is a method for sorbing a liquid, comprising contacting the liquid with a sorbent material comprising a glass fiber material and at least one hydrophilic particulate material.

DETAILED DESCRIPTION OF THE INVENTION

The present inventor has found that glass fibers can be used in combination with absorbent polymeric materials to form sorbent materials. The sorbent materials are particularly useful in absorbing water and aqueous liquids. Depending upon the composition of the polymeric particles, the inflammability of the materials of the invention can be reduced in comparison to conventional absorbent materials that include fibers. The sorbent materials of the present invention provide improved sorption as compared to conventional fibrous absorbing materials and conventional absorbing materials containing absorbent particles.

The term "sorbent", as used herein, includes absorption and adsorption. Absorption of a liquid means that the liquid penetrates to the interior of the sorbing material, whereas adsorption of a liquid means that the liquid is attracted to and held on the surface of the sorbing material.

The sorbent materials of the present invention may be referred to as "super-sorbent". The term "super-sorbent" refers to materials that include, in addition to sorbent glass fiber materials, sorbent particles, and can absorb several times their weight, such as 10 or fifteen times their weight, in liquid. The sorbent particles provide increased sorbency as compared to the glass fiber materials alone.

Figure 2:
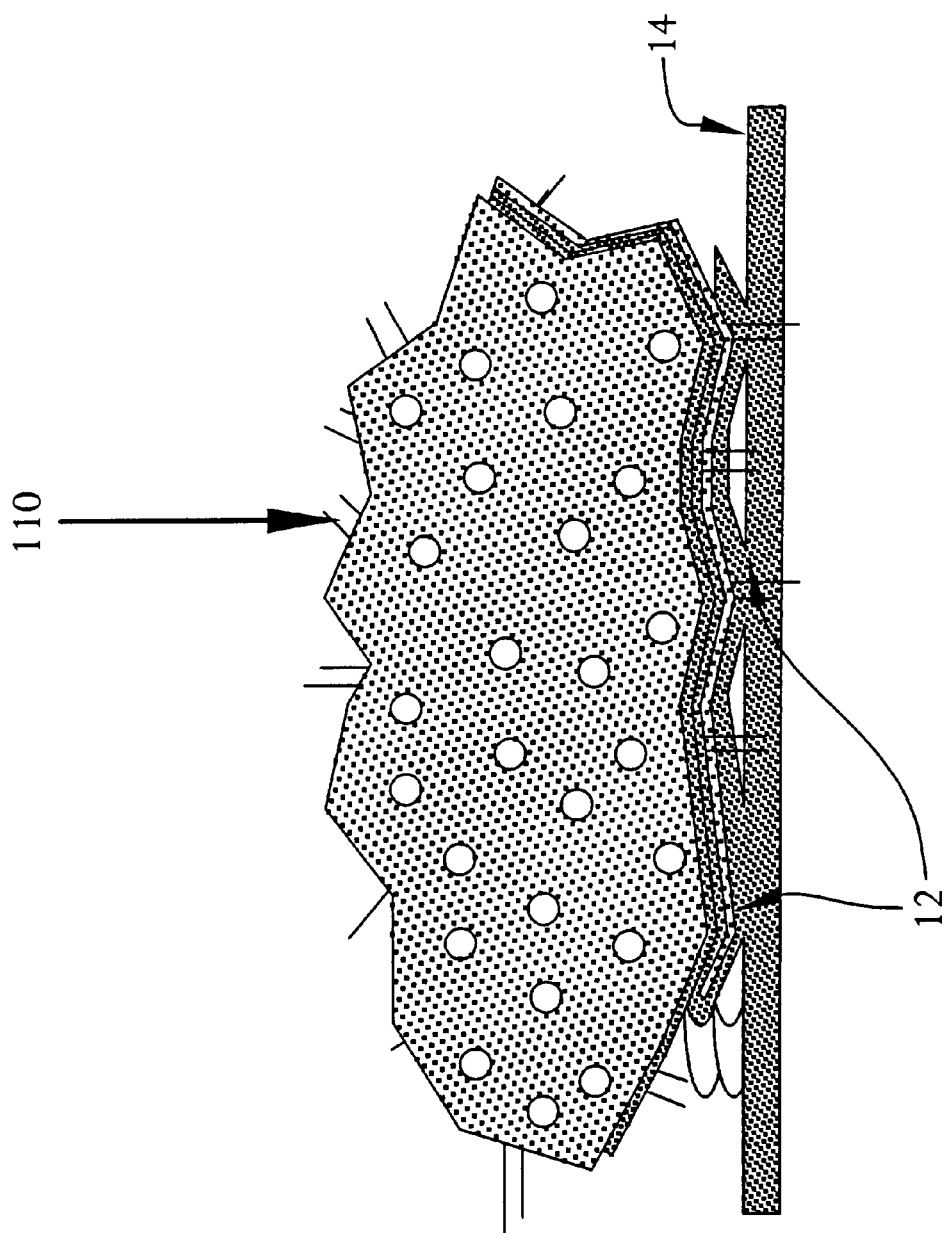
FIG. 2 is a view similar to FIG. 1 of a sorbent glass fiber material according to the present invention sorbing water.

FIG. 2 illustrates a mass of sorbent glass fiber material 110 in accordance with the present invention, in contact with and adsorbing a quantity of water 12 disposed on solid substrate 14. The glass fibers 110 may comprise a mass of unbindered, loose-fill glass fibers, or bindered glass fibers such as batting insulation. Loose-fill glass fibers are commercially available, for example, in the form of glass fiber insulation commonly referred to as "blown wool" insulation. Bindered insulation can include a binder substance such as cured phenolic binder or the like. Examples of suitable glass fiber materials for use according to the present invention include INSUL-SAFE III® blowing insulation made by CertainTeed Corporation of Valley Forge, Pa.; RICH-R™ blowing insulation made by Johns Manville of Denver, Colo.; and THERMACUBE™ insulation made by Owens-Corning Corp. of Toledo, Ohio. The sorbent glass fiber material of the invention further comprises a quantity of hydrophilic sorbent particles 16 dispersed throughout the mass of glass fibers. The sorbent materials of the invention may, if desired, be placed within a sock or boom, and the glass fiber material may be shredded, as described in U.S. Pat No. 5,215,407, the disclosure of which is hereby incorporated herein by reference in its entirety. Also if desired, the materials may comprise particles of additional materials such as cork or polystyrene foam.

Any commercially available hydrophilic particulate material capable of absorbing several times its weight in water or aqueous solution, preferably at least about 10 to about 100 times its weight, may be used for particles 16. For example, particles 16 may include modified starches, or high molecular weight acrylic polymers containing hydrophilic groups such as those disclosed in U.S. Pat No. 4,429,001, the disclosure of which is hereby incorporated herein by reference in its entirety. U.S. Pat No. 4,429,001 discloses sorbent particles made of modified food starches and high molecular weight acrylic polymers containing hydrophilic groups for absorbing water, and absorbent alkylstyrene particles for absorbing liquids other than water. Other suitable particles are disclosed in U.S. Pat No. 3,670,731, the disclosure of which is hereby incorporated herein by reference in its entirety. U.S. Pat No. 3,670,731 discloses the use of particles made of colloidal material, in combination with a carrier sheet, for sorbing fluids. The colloidal material is made from hydrocolloid polymer having a particular degree of crosslinking, so that it is water insoluble but swells when absorbing liquid. Polymers disclosed include crosslinked polyacrylamides, crosslinked sulfonated polystyrene, and mixtures thereof. Still other suitable particles include crosslinked polyacrylates and polymethacrylates, and crosslinked acrylate/methacrylate copolymers. Other suitable polymeric materials suitable for the particles used in the present invention, are polymers formed from acrylic acid or salts thereof, copolymerized with at least one other hydrophilic monomer, and other polymers disclosed in U.S. Pat No. 4,914,170, the disclosure of which is hereby incorporated herein by reference in its entirety. Crosslinked polyacrylate particles useful in the methods and compositions of the present invention include those sold by Emerging Technologies Inc. of Greensboro, N.C.

When particles are used in combination with glass fiber materials in the methods and compositions of the present invention, the amount of particles preferred will generally be determined by factors such as the desired absorbency in balance with cost. For example, the amount of particles used may be from about 5 weight percent to about 20 weight percent, preferably from about 10 weight percent to about 15 weight percent, based on the weight of the glass fiber material. The particle size is not critical, and may be, for example, from about 50 to about 3000 micrometers in average diameter, preferably from about 75 to about 1500 micrometers. Although the exemplary size ranges are provided in average diameters, it is not necessary that the particles be spherical. Rather, the particles can have any shape and, in the case of non-spherical particles, the exemplary average diameters recited above refer to the largest dimension of a non-spherical particle. A mixture of two or more types of particles may be used.

Particles 16 may be combined with glass fibers 10 by any method known to those skilled in the art for substantially uniformly dispersing the particles throughout the mass of glass fibers. For example, particles 16 and glass fibers 10 may be placed together in a vessel (not shown) with the vessel being thereafter vigorously agitated for a time sufficient to infuse the glass fibers with the particles. The time and intensity of agitation will vary depending on the fiber density of the glass fibers 10 and the size of particles 16. Alternatively, particles 16 may be infused into the glass fibers 10 at the time of manufacture in a manner similar to that disclosed in U.S. Pat No. 3,670,731. Preferably, however, the particles 16 are incorporated into glass fibers 10 by agitation at a rate and for a time sufficient to disperse the particles substantially uniformly throughout the fiber matrix.

The present invention is further described in the following Examples. The examples are merely illustrative of the present invention and should not be construed as limiting the scope of the invention in any way.

EXAMPLES

Trials were conducted comparing the sorbency of loose and bindered conventional glass fibers 10 and loose and bindered sorbent glass fibers 110. Four samples were prepared, each sample including 30 grams of glass fibers. The unbindered and bindered samples 110 further included 4 grams (13.3 weight percent based on the weight of glass fibers) crosslinked polyacrylate particles 16 from Emerging Technologies Inc. of Greensboro, N.C. Each of the four samples was placed in a pan filled with water. Each sample was allowed to sorb water until completely saturated. Thereafter, the samples were placed on a ¼" mesh screen and permitted to drain freely. After five minutes the samples were removed from the screens and weighed to determine the total amount of water retained by each sample.

Figure 3:
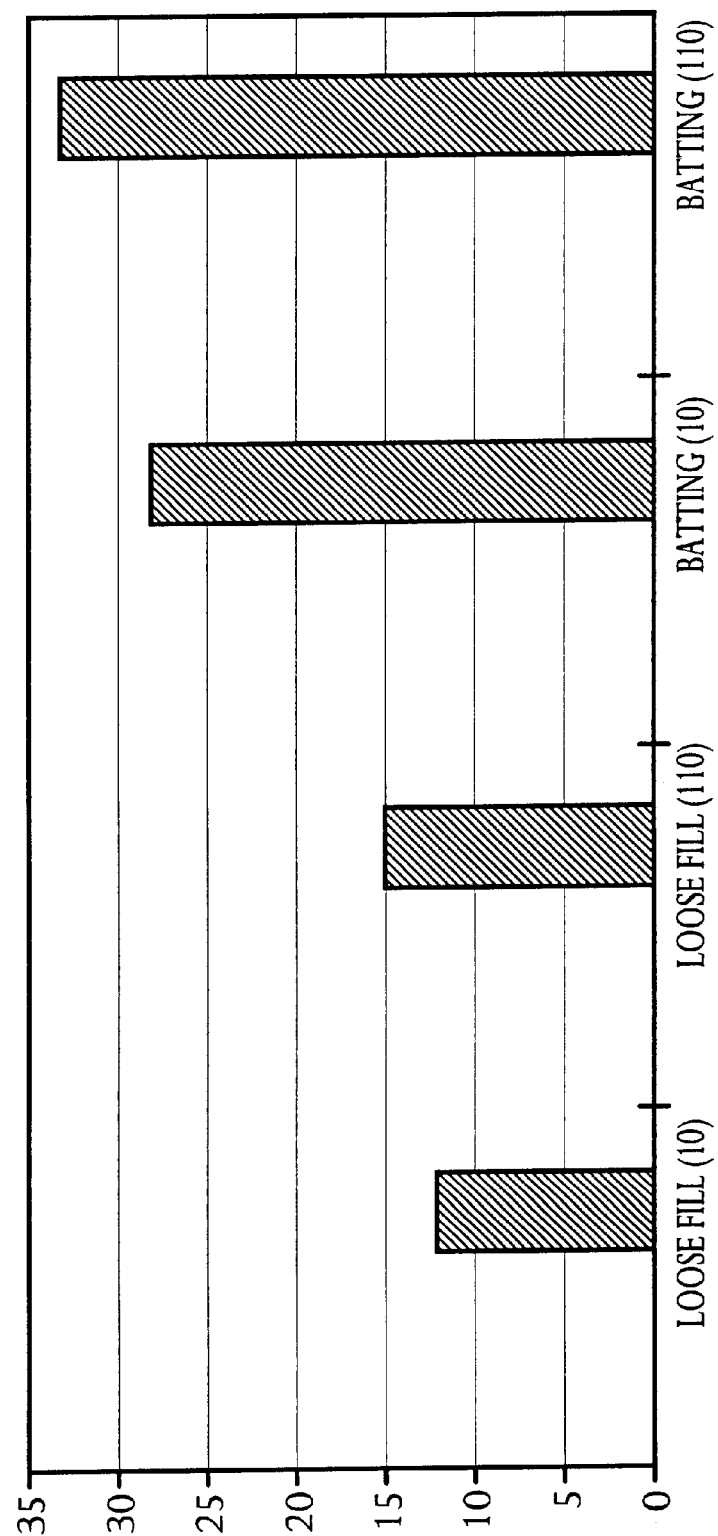
FIG. 3 is a graphical depiction of the relative water sorbencies of several samples of conventional glass fiber materials and sorbent glass fiber materials according to the present invention.

The results are shown in FIG. 3. As shown, the sample containing conventional loose-fill glass fibers 10 sorbed approximately 12 times its weight in water, while the sample containing loose-fill glass fibers 110 and particles according to the present invention sorbed approximately 15 times its weight in water. The sample containing conventional bindered batting glass fibers 10 sorbed approximately 28 times its weight in water, while the sample containing bindered batting glass fibers 110 and particles according to the present invention sorbed approximately 33 times its weight in water.

Thus, FIG. 3 illustrates the improved capacity of loose-fill and bindered glass fiber materials 110 modified with particles 116 in accordance with the present invention to sorb water as compared to the capacity of conventional loose-fill and bindered glass fiber materials.

The sorbent materials of the present invention may be used, for example, for cleaning up spills. When used to remove a water-soluble pollutant discharged into a body of water the sorbent materials may simply be cast upon the spill whereby the pollutant is quickly sorbed along with its water solvent. The same method may be used when the pollutants are in aqueous solution and discharged onto land structures. When the spill is land based and the pollutant is undiluted, the pollutant may be diluted with water prior to dispensing the sorbent material thereon to assure complete sorption of the pollutant.

It will be understood that various changes in the details, including materials, which have been described and illustrated above in order to explain the nature of this invention may be made by those skilled in the art without departing from the principles and scope of the invention. Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A sorbent material comprising a mass of glass fiber material and at least one hydrophilic particulate material dispersed throughout said mass of glass fiber material.

2. The sorbent material of claim 1 wherein the amount of said hydrophilic particulate material is from about 5 weight percent to about 20 weight percent based on the weight of the glass fiber material.

3. The sorbent material of claim 1 wherein said glass fiber material comprises loose-fill glass fibers.

4. The sorbent material of claim 1 wherein said glass fiber material comprises bindered glass fibers.

5. The sorbent material of claim 1 wherein said hydrophilic particulate material is selected from the group consisting of modified starches, high molecular weight acrylic polymers with hydrophilic groups, crosslinked polyacrylamide, crosslinked sulfonated polystyrene, crosslinked polyacrylates, crosslinked polymethacrylates, crosslinked copolymers of acrylates and methacrylates, and mixtures thereof.

6. The sorbent material of claim 1, wherein said particulate material comprises particles having average diameters from about 50 micrometers to about 3000 micrometers.

7. A method for sorbing a liquid, comprising contacting the liquid with a mass of glass fiber material and at least one hydrophilic particulate material dispersed throughout said mass of glass fiber material.

8. The method of claim 7, wherein said particulate material comprises particles having average diameters from about 50 micrometers to about 3000 micrometers.

9. The method of claim 7, wherein said hydrophilic particulate material is selected from the group consisting of modified starches, high molecular weight acrylic polymers with hydrophilic groups, crosslinked polyacrylamide, crosslinked sulfonated polystyrene, crosslinked polyacrylates, crosslinked polymethacrylates, crosslinked copolymers of acrylates and methacrylates, and mixtures thereof.

* * * * *

UNITED STATES PATENT AND TRADEMARK OFFICE
CERTIFICATE OF CORRECTION

| | | |
|---|---|---|
| PATENT NO. | : 6,180,233 B1 | Page 1 of 1 |
| APPLICATION NO. | : 09/368809 | |
| DATED | : January 30, 2001 | |
| INVENTOR(S) | : Wayne E. Shaw | |

It is certified that error appears in the above-identified patent and that said Letters Patent is hereby corrected as shown below:

The figure shown on the front page should be replaced with Figure 2.

Figure 1:
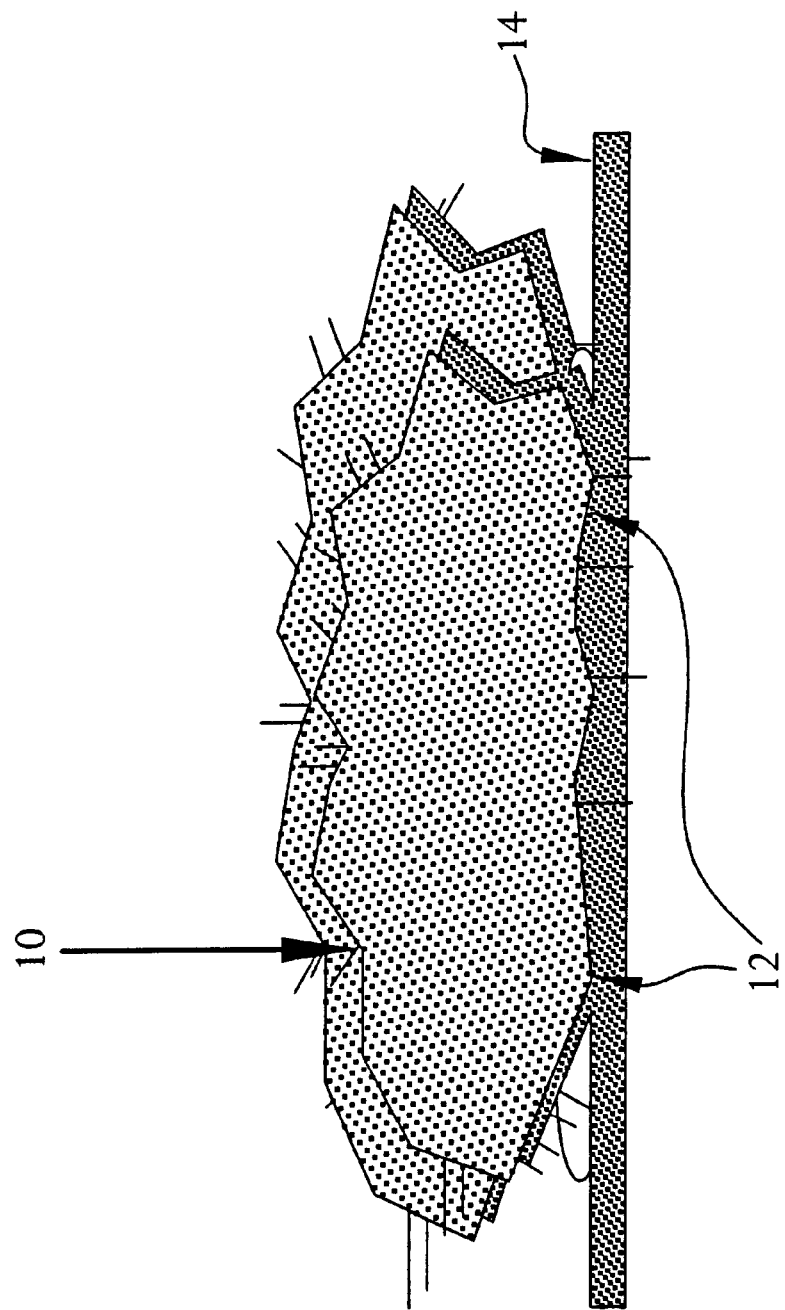
FIG. 1 is a view depicting the characteristic ability of conventional glass fiber material to sorb water.

Figure 1 should be labeled as --(PRIOR ART)--.

Figure 2 should be replaced with the corrected version shown below, properly identifying the hydrophilic sorbent particles with reference number 16.

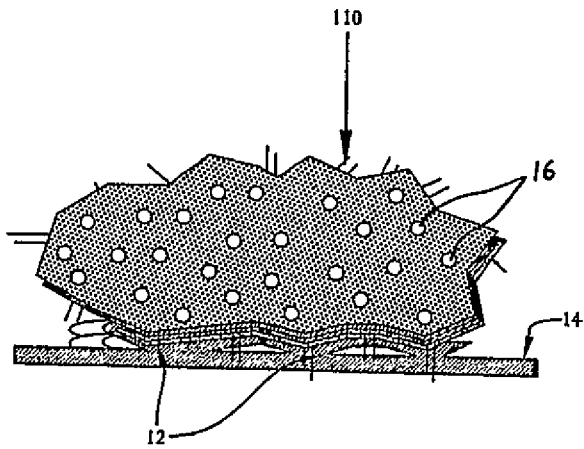

FIG. 2

Signed and Sealed this

Twenty-third Day of October, 2007

JON W. DUDAS
*Director of the United States Patent and Trademark Office*